United States Patent [19]
Chuang

[11] Patent Number: 5,826,770
[45] Date of Patent: Oct. 27, 1998

[54] CARRYING BAG FOR A NOTEBOOK COMPUTER AND PERIPHERALS

[76] Inventor: Yao Tang Chuang, P.O. Box 82-144, Taipei, Taiwan

[21] Appl. No.: 889,846

[22] Filed: Jul. 8, 1997

[51] Int. Cl.$^6$ ........................................... A45C 3/02
[52] U.S. Cl. ............................ 224/607; 190/11; 190/100; 224/577; 224/644; 224/655
[58] Field of Search ...................................... 224/607, 644, 224/657, 654, 655, 929, 575, 577; 361/680, 683; D3/319, 900; 190/125, 102, 127, 11, 100

[56] References Cited

U.S. PATENT DOCUMENTS

| | | | |
|---|---|---|---|
| 2,574,089 | 11/1951 | Cochran | 190/125 |
| 4,854,432 | 8/1989 | Carpenter et al. | 190/127 X |
| 5,639,004 | 6/1997 | Carlton et al. | 224/644 X |

*Primary Examiner*—Renee S. Luebke
*Attorney, Agent, or Firm*—A & J

[57] ABSTRACT

A carrying bag for a notebook computer and peripherals includes a rectangular case provided with a handle, a shoulder strap, and two positioning straps, the straps having two engageable connectors, a cover having one side connected with one side of the rectangular case and three sides sealably connected with the rectangular case by a zipper, a pair of supporting straps connected between the rectangular case and the cover, each of the supporting straps having an inner side provided with a seam at an intermediate portion thereof, and a rectangular tray having four vertical side walls and a bottom wall, the rectangular tray being dimensioned to fit into the rectangular case, whereby one may use a notebook computer and necessary peripherals conveniently no matter where he is.

5 Claims, 7 Drawing Sheets

CARRYING BAG FOR A NOTEBOOK COMPUTER AND PERIPHERALS

BACKGROUND OF THE INVENTION

1. Field of the Invention

This invention is related to a bag and in particular to one for carrying a notebook computer and necessary peripherals.

2. Description of the Prior Art

Conventionally, one uses a bag to carry a notebook computer together with necessary peripherals such as, for example, adaptor, modem, mouse, and the like. However, such a bag is simply made of cloth or synthetic material and the notebook computer therein will not have any effective protection when colliding with other objects. Furthermore, the side walls of the bag are higher than the top of the notebook computer so that when the user operates the keyboard of the notebook computer, he must life his wrist in order to prevent interfering with the side walls of the bag thereby making him easily fatigued. In addition, the floppy disk drive, CD-Rom, power socket, PC card slot and zip drive are arranged on the vertical sides of the notebook computer, the operation of these devices would interfere with the side walls of the bag thus causing much inconvenience in use. Furthermore, if an user put the notebook computer on his lap top for operation, it will easily slip off his lap top and fall down on the floor.

Therefore, it is an object of the present invention to provide a carrying bag for a notebook computer and peripherals which can obviate and mitigate the above-mentioned drawbacks.

SUMMARY OF THE INVENTION

This invention is related to an improved carrying bag for a notebook computer and peripherals.

It is the primary object of the present invention to provide a carrying bag for a notebook computer and necessary peripherals which enables one to use a notebook computer and necessary peripherals conveniently no matter where he is.

It is another object of the present invention to provide a carrying bag for a notebook computer and necessary peripherals which can effectively prevent the notebook computer from being damaged when colliding with other objects.

It is still another object of the present invention to provide a carrying bag for a notebook computer which enables one to operate a notebook computer without worrying that it would slip off his lap top.

It is still another object of the present invention to provide a carrying bag for a notebook computer and necessary peripherals which is fit for practical use.

It is still another object of the present invention to provide a carrying bag for a notebook computer and necessary peripherals which is easy to manufacture.

It is a further object of the present invention to provide a carrying bag for a notebook computer and necessary peripherals which is simple in construction.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numberals refer to identical or similar parts.

BRIEF DESCRIPTION OF THE DRAWINGS

The invention is further described hereafter, by way of example only, with reference to the accompanying drawings, in which.

DETAILED DESCRIPTION OF THE PREFERRED EMBODIMENT

Figure 1:
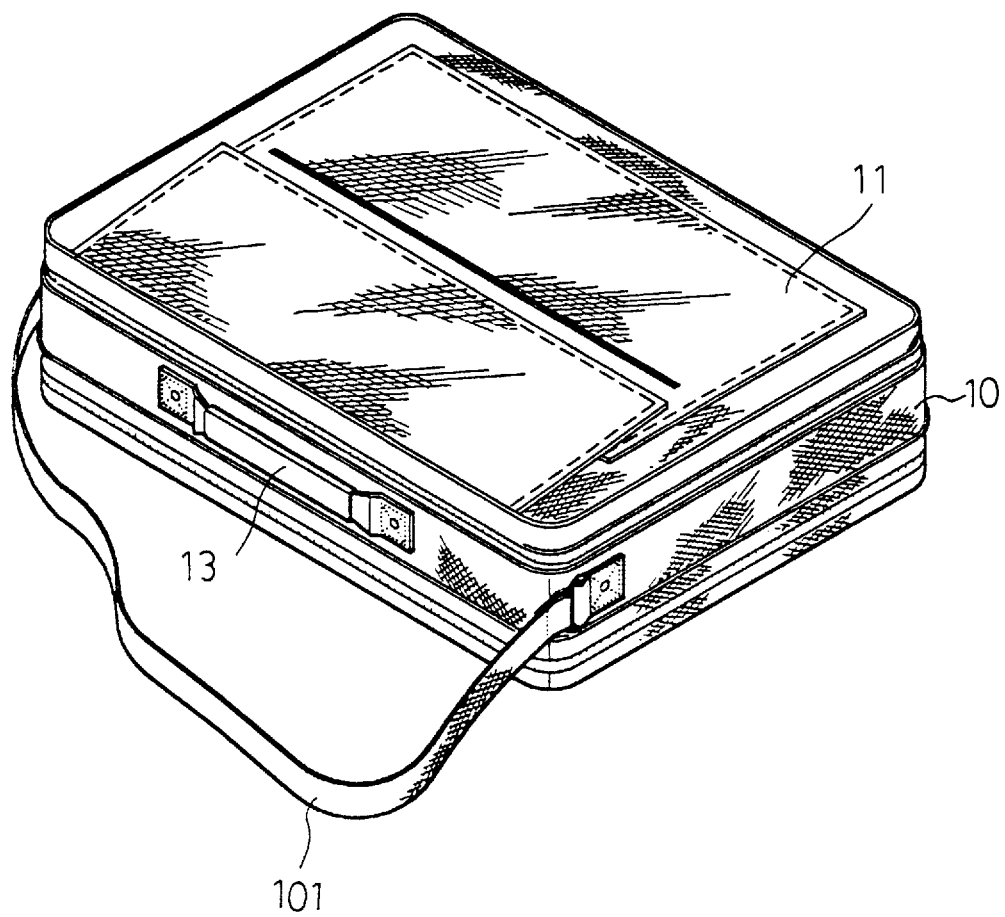
FIG. 1 is a perspective view of the present invention shown in closed condition.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
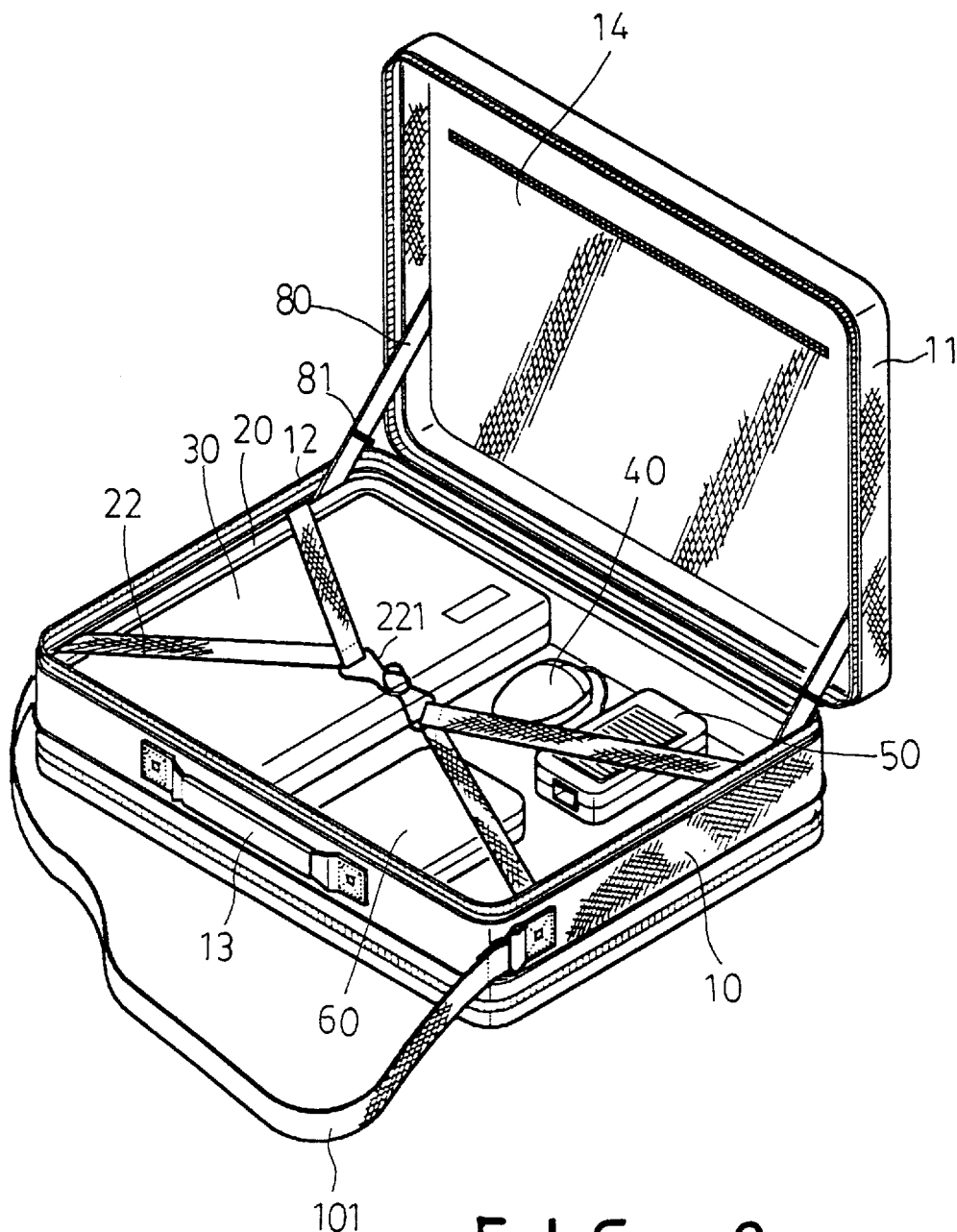
FIG. 2 is a perspective view of the present invention shown in open condition.
Figure 3:
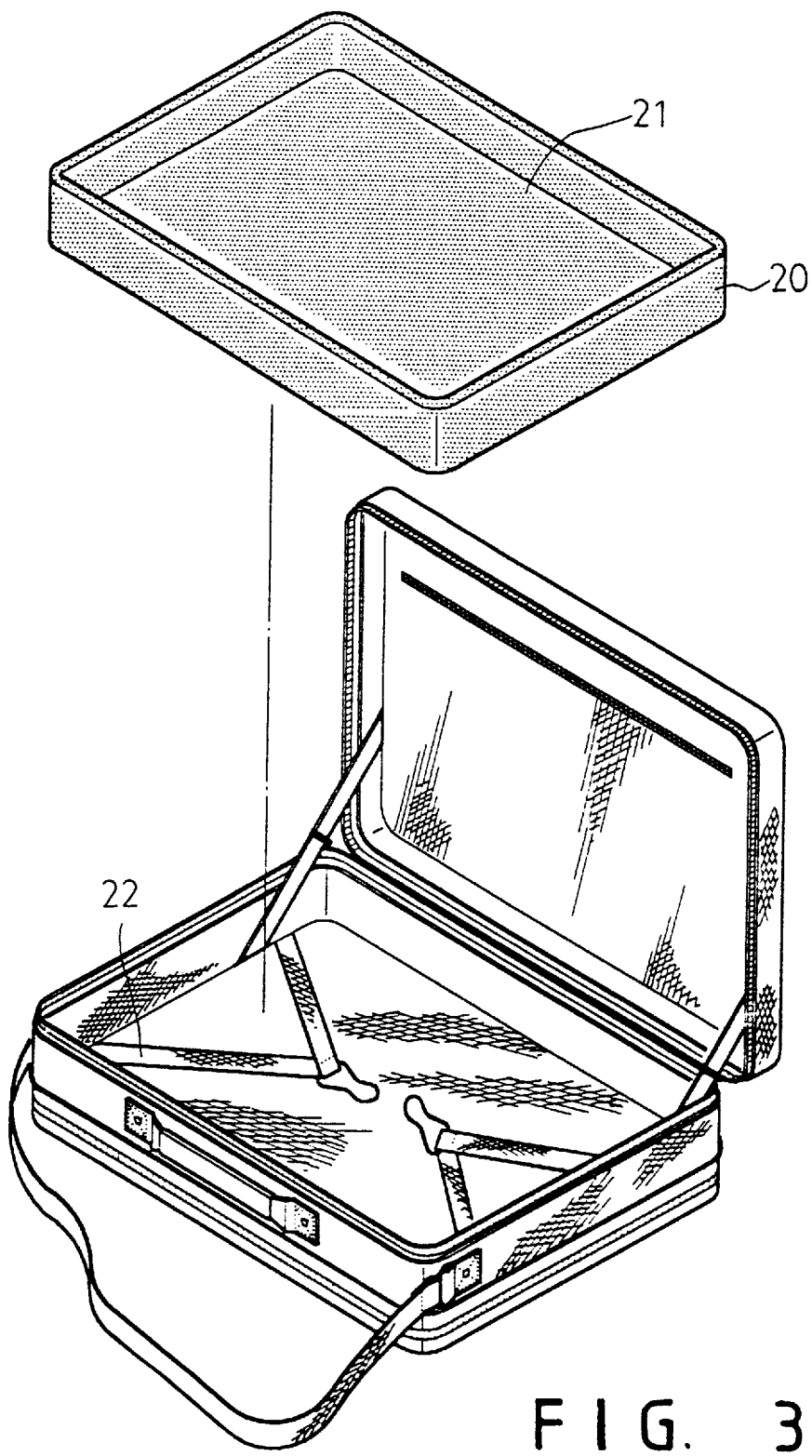
FIG. 3 is an exploded view of the present invention.

With reference to the drawings and in particular to FIGS. 1, 2 and 3 thereof, the carrying bag for a notebook computer and peripherals according to the present invention generally comprises a rectangular case 10 and a tray 20.

The rectangular case 10 is provided with a handle 13 at its one side by which the carrying bag can be held easily. A shoulder strap 101 is mounted on the rectangular case 10 for enabling the carrying bag to be carried on one's shoulders. Two opposite inner sides of the rectangular case 10 are provided with two straps 22, respectively. Each of the straps 22 has a connector 221 at the intermediate portion so that the two straps 22 can be easily engaged to keep the notebook computer 30, mouse 40, modem 50 and floppy disk container 60 in place.

Figure 2A:
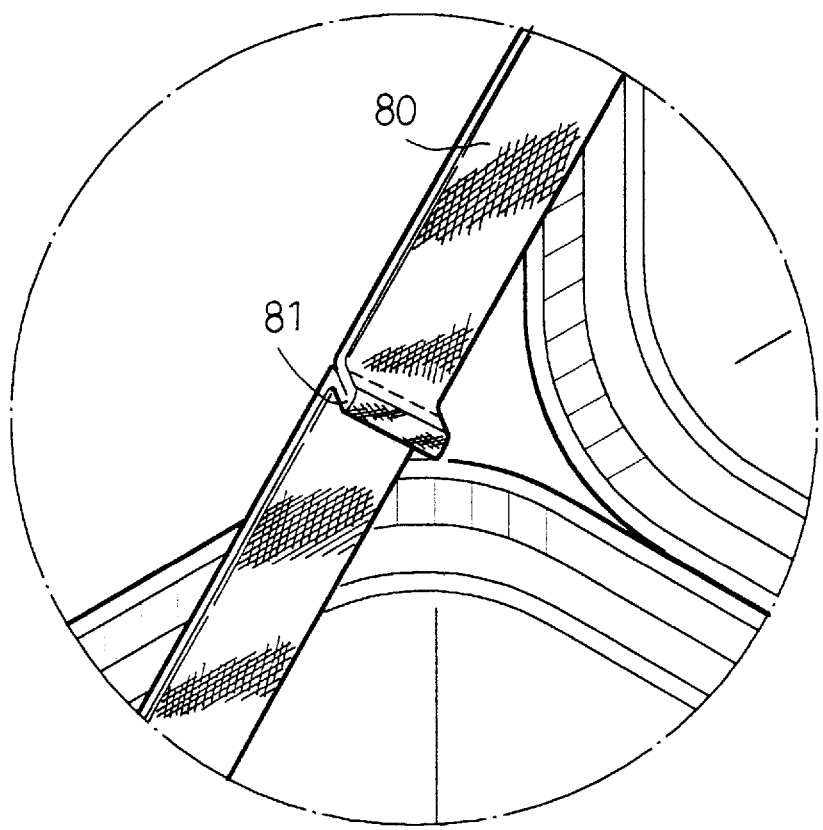
FIG. 2A is an enlarged fragmentary view of FIG. 2.

A cover 11 is connected with one side of the rectangular case 10 for closing the rectangular case 10 and protecting the articles therein from being damaged. The other three sides of the cover 11 are sealably connected with the rectangular case 10 by a zipper 12 so that the carrying bag can be conveniently zipped open or shut as desired. Both the rectangular case 10 and the cover 12 are preferably made of flexible material such as soft cloth, synthetic leather or the like. The inner side of the cover 11 has a pocket 14 for receiving any desired articles. The cover 11 is further connected with the rectangular case 10 by a pair of supporting straps 80, each at a side thereof, for keeping the cover 11 at an upright position when opened. Each of the supporting straps 80 is provided with a seam 81 (see FIG. 2A) at the inner side so that when the cover 11 is closed, the supporting strap 80 will be automatically folded into the rectangular case 10 thus causing much convenience in use.

The tray 20 is an open-top rectangular member having four vertical side walls and a bottom wall thereby forming a recess 21 for receiving a notebook 30, a mouse 40, a modem 50, a floppy disk container 60 and the like therein. The tray 20 is dimensioned to fit into the rectangular case 10 and provided with cushions 25 (see FIG. 6) around its circumference thereby preventing the notebook computer 30 and the peripherals from being damaged in case the carrying bag collides with other objects inadvertently.

Figure 4:
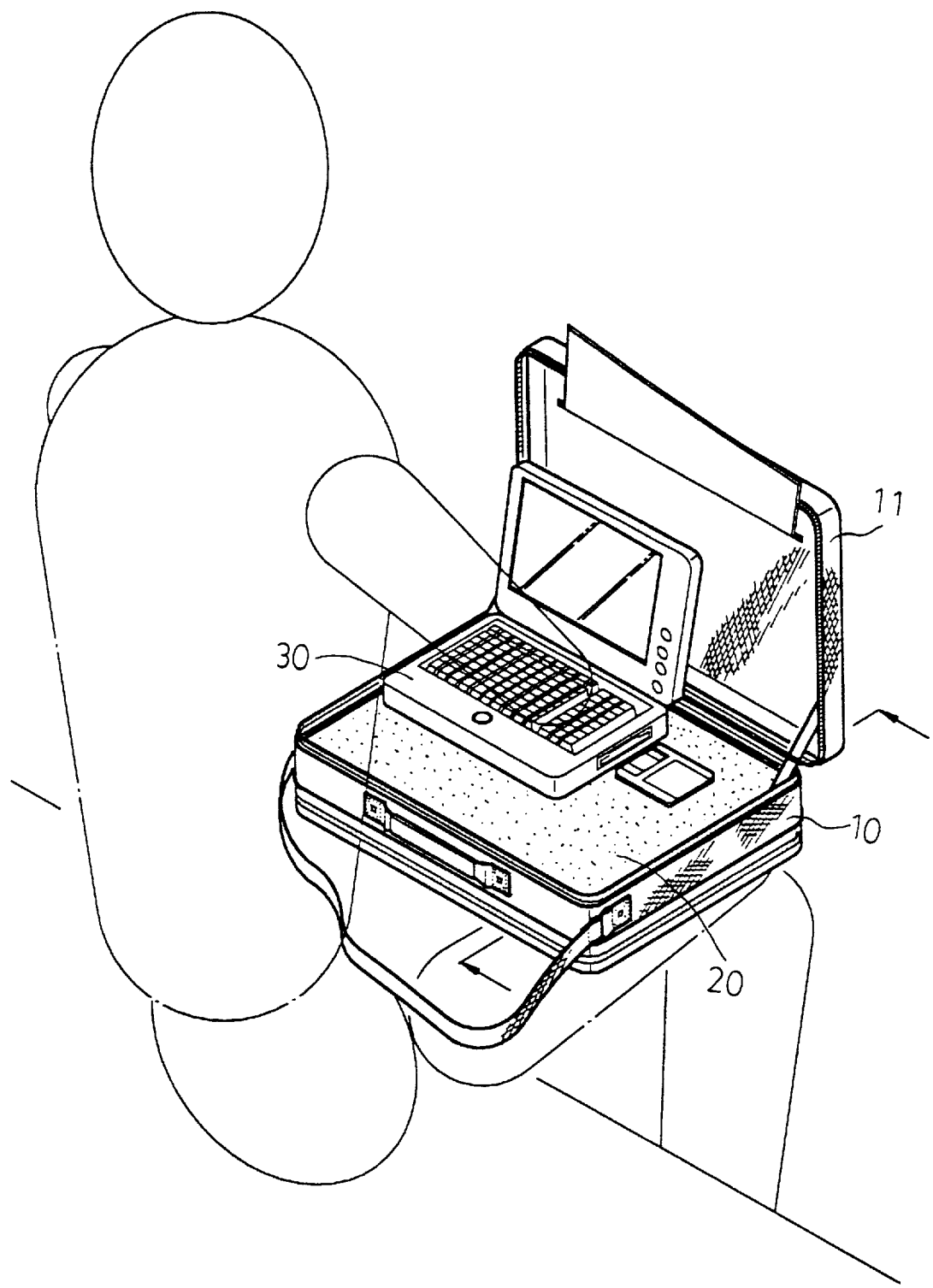
FIG. 4 is a working view of the present invention.

When in use, the zipper 12 is first zipped open and the notebook 30 is taken out of the rectangular tray 20. Then, the peripherals such as the mouse 40, modem 50 and floppy disk container 60 are put into the pocket 14 of the cover 11. Thereafter, the tray 20 is removed from the rectangular case 10 and disposed up side down into the rectangular case 10 again to form a table top for supporting the notebook computer 30. The tray 20 is designed and dimensioned so that when it is put up side down into the rectangular case 10, the top of the tray 20 will be even with the edges of the rectangular case 10 so that one may operate the notebook computer 30 and insert a CD-Rom, floppy disk or the like into the notebook computer 30 without interfering with the edges of the rectangular case 10 (see FIGS. 4 and 6).

Figure 5:
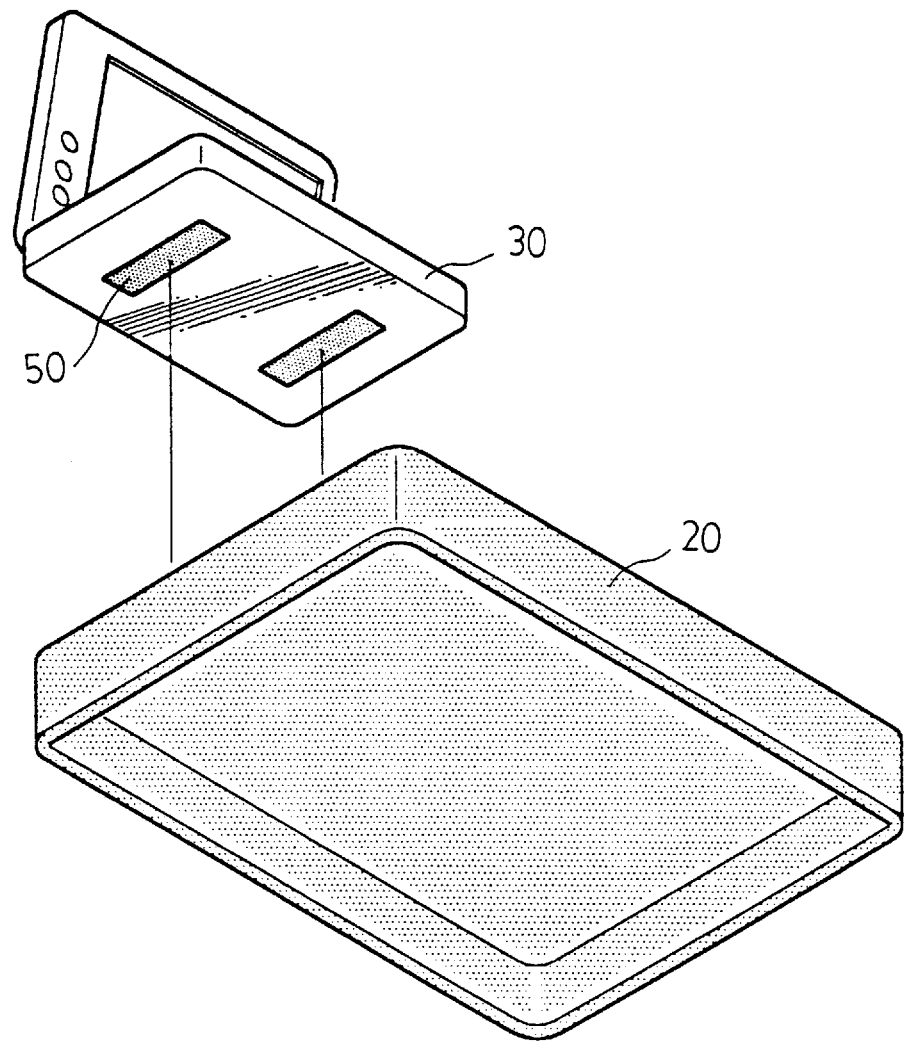
FIG. 5 illustrates how a notebook computer can be firmly kept on the tray.
Figure 6:
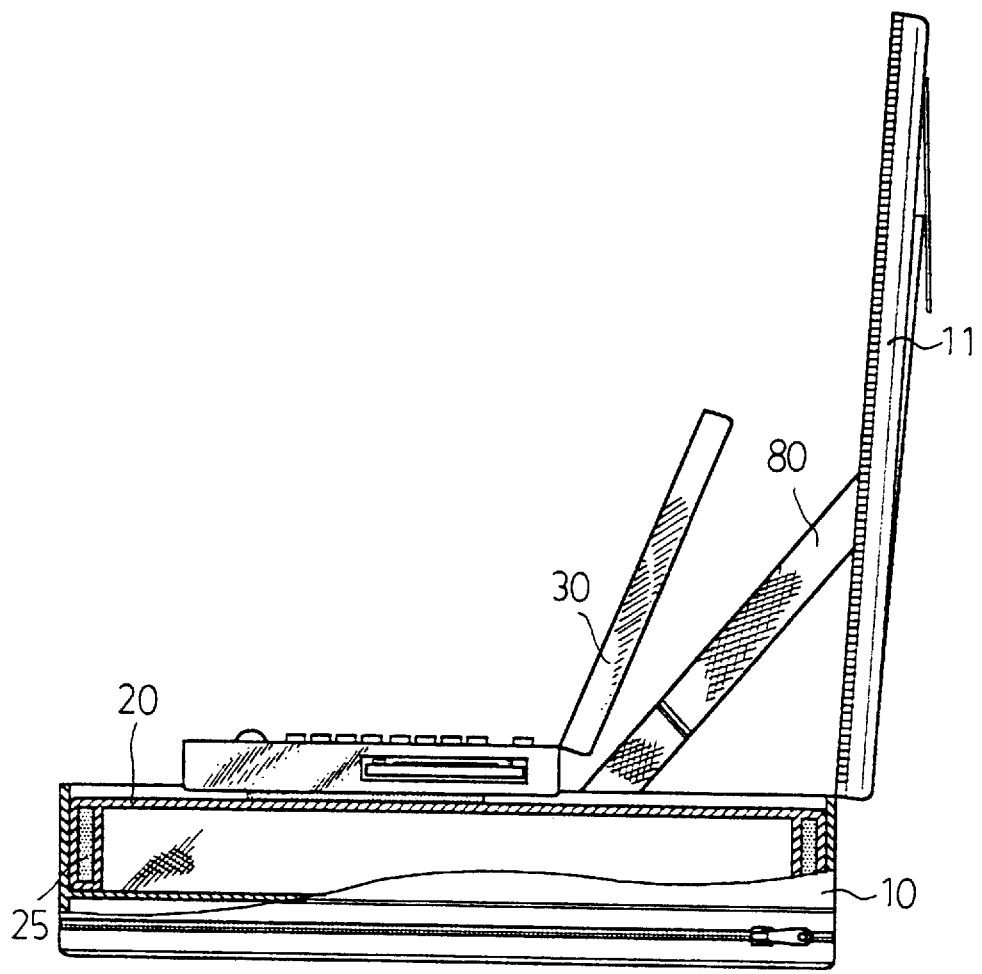
FIG. 6 is a sectional view of the present invention.

As shown in FIGS. 5 and 6, the bottom of the computer 30 is provided with a slip-proof means 50 for preventing the notebook computer 30 from slipping down from the tray 20 so that a user may place the notebook computer 30 on his lap top for operation without worrying that it would slip off his lap top and fall down on the floor.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A carrying bag for a notebook computer and peripherals comprising:

a rectangular case provided with a handle, a shoulder strap, and two positioning straps 22, said straps having two engageable connectors 221;

a cover having one side connected with one side of said rectangular case and three sides sealably connected with said rectangular case by a zipper;

a pair of supporting straps connected between said rectangular case and said cover, each of said supporting straps having an inner side provided with a seam at an intermediate portion thereof; and a rectangular tray having four vertical side walls and a bottom wall, said rectangular tray being dimensioned to fit into said rectangular case.

2. The carrying bag for a notebook computer and peripherals as claimed in claim 1, wherein said rectangular case and said cover are preferably made of soft cloth.

3. The carrying bag for a notebook computer and peripherals as claimed in claim 1, wherein said rectangular case and said cover are preferably made of synthetic leather.

4. The carrying bag for a notebook computer and peripherals as claimed in claim 1, wherein said cover has an inner side formed with a pocket.

5. The carrying bag for a notebook computer and peripherals as claimed in claim 1, wherein said rectangular tray is provided with cushions around a circumference thereof.

\* \* \* \* \*